United States Patent [19]

Nakamura

[11] Patent Number: 4,987,301
[45] Date of Patent: Jan. 22, 1991

[54] REFLECTIVE OPTICAL ENCODER DEVICE WITH LIGHT BEAMS APPLIED AS SPATS SPACED BY 2 PREDETERMINED PITCH

[75] Inventor: Nobuaki Nakamura, Fujieda, Japan

[73] Assignee: Victor Company of Japan, Ltd., Japan

[21] Appl. No.: 442,108

[22] Filed: Nov. 28, 1989

[30] Foreign Application Priority Data

Nov. 28, 1988 [JP] Japan .................. 63-300084

[51] Int. Cl.⁵ .................. G01D 5/34
[52] U.S. Cl. .................. 250/231.16; 369/44.37
[58] Field of Search .................. 250/231.14, 231.16; 356/275; 369/44.37

[56] References Cited

U.S. PATENT DOCUMENTS

| | | | |
|---|---|---|---|
| 4,680,466 | 7/1987 | Kuwahara et al. | 250/231.16 |
| 4,795,901 | 1/1989 | Kitazawa | 250/231.16 |
| 4,827,123 | 5/1989 | Gray | 250/231.14 |

Primary Examiner—David C. Nelms
Attorney, Agent, or Firm—Lowe, Price, LeBlanc, Becker & Shur

[57] ABSTRACT

A reflective rotary optical encoder device for detecting an angular speed or position of a movable member includes an optical encoder disc rotatable with the movable member, the optical encoder having an encoder track composed of a series of equally spaced pits alternating with inter-pit lands therebetween, the pits and the inter-pit lands having equal lengths l. A laser beam pickup applies three laser beams as respective laser beam spots to the optical encoder and detects laser beams reflected from the laser beam spots on the optical encoder to produce electric signals representative of the encoder track. Adjacent light beam spots on the optical encoder are spaced at a pitch P expressed by:

$$P = \left(\frac{1.5 + n}{2}\right)l$$

where n is an integer of 1 or more. The length l may be substantially the same as or larger than the diameter of each of the laser beam spots. The electric signals produced by the laser beam pickup include a focus servo signal, a tracking servo signal, and two signals each representative of encoder track which are out of phase with each other by a phase angle of 90°.

6 Claims, 4 Drawing Sheets

FIG. 3A
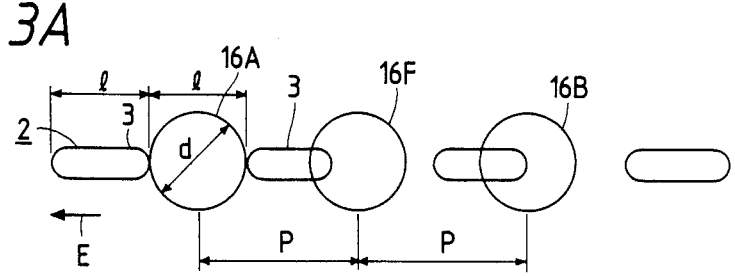
FIG. 3B
FIG. 3C
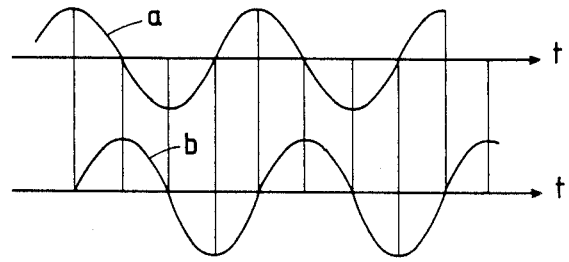
FIG. 4A
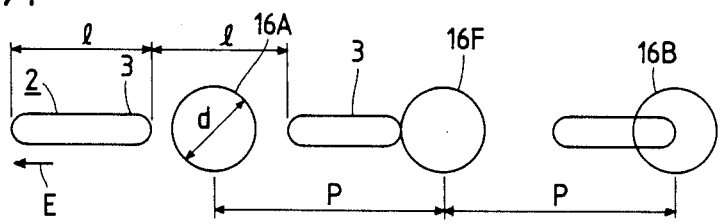
FIG. 4B
FIG. 4C
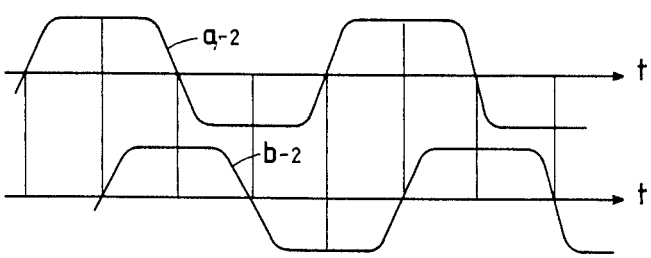

TOO CLOSE
(DEFOCUSED)

FOCUSED

TOO FAR
(DEFOCUSED)

REFLECTIVE OPTICAL ENCODER DEVICE WITH LIGHT BEAMS APPLIED AS SPATS SPACED BY 2 PREDETERMINED PITCH

BACKGROUND OF THE INVENTION

The present invention relates to a reflective optical encoder device for optically detecting an angular or linear speed or position of a movable member by applying a laser beam to a series of pits or depressions burned in an encoder disc that is coupled to the movable member and then reading a laser beam modified and reflected by the series of pits.

Optical encoder devices such as rotary optical encoder devices are widely used in the art. A rotary optical encoder device has an input shaft directly coupled to a rotatable drive shaft of a movable member whose angular speed or position is to be measured. The angular speed or position of the drive shaft is optically detected by a light beam, such as a laser beam, applied to and modified somehow by an encoder disc that is coupled to the input shaft.

Rotary optical encoder devices are roughly grouped into two classes. In one class, a rotary encoder disc has a multiplicity of slits or pits which are detected by a light beam passing through the slits or pits and modified thereby during rotation of the rotary encoder disc. According to the other group, slits or pits defined in a rotary encoder disc are detected by a light beam reflected and modified by the slits or pits while the rotary encoder disc is rotating.

More specifically, a reflective rotary optical encoder comprises a rotary encoder disc having ring-shaped encoder tracks in the form of a series of slits or pits defined in a certain circumferential pattern by the process of manufacturing optical discs such as video discs and compact discs. A laser beam which is generated typically by a semiconductor laser is applied to the encoder tracks of the rotary encoder disc. The encoder tracks are thus read by detecting a laser beam reflected from the encoder disc and modulated in intensity by the encoder tracks, and converting the detected laser beam to an electric signal.

According to one conventional reflective rotary optical encoder device, such an electric signal has been generated by a laser beam pickup which adds all output signals from a four-sector photodiode that is also used to produce a focus servo signal. The laser beam pickup of the conventional reflective rotary optical encoder device cannot however generate two signals which are out of phase with each other by a phase angle of 90° for detecting the direction in which the the rotary encoder disc rotates.

SUMMARY OF THE INVENTION

It is an object of the present invention to provide a reflective optical encoder device such as a reflective rotary optical encoder device which includes a laser beam pickup for applying three laser beams to a rotary encoder disc and processing laser beams reflected from the rotary encoder disc to generate a focus servo signal, a tracking servo signal, and two signals each representative of an encoder track on the encoder disc, the two signals being 90° out of phase with each other for detecting the direction in which the rotary encoder disc rotates.

According to the present invention, a reflective optical encoder device for detecting an angular or linear speed or position of a movable member includes an optical encoder movable in response to angular or linear movement of the movable member, the optical encoder having an encoder track composed of a series of equally spaced pits alternating with inter-pit lands therebetween, the pits and the inter-pit lands having equal lengths l; and a light beam pickup for applying three light beams as respective light beam spots to the optical encoder and detecting light beams reflected from the light beam spots on the optical encoder to produce electric signals representative of the encoder track. Adjacent light beam spots on the optical encoder are spaced at a pitch P expressed by:

$$P = \left( \frac{1.5 + n}{2} \right) l$$

where n is an integer of 1 or more.

The length l may be substantially the same as or larger than the diameter of each of said light beam spots.

The electric signals produced by the light beam pickup include a focus servo signal, a tracking servo signal, and two signals each representative of said encoder track which are out of phase with each other by an electric angle of 90°.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 3A through 3C and 4A through 4C are diagrams illustrative of how signals are generated by the reflective rotary encoder device shown in FIG. 2;

DETAILED DESCRIPTION

Figure 1A:
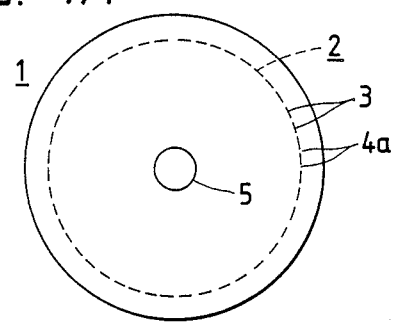
FIG. 1A is a schematic plan view of a reflective optical rotary encoder disc.
Figure 1B:
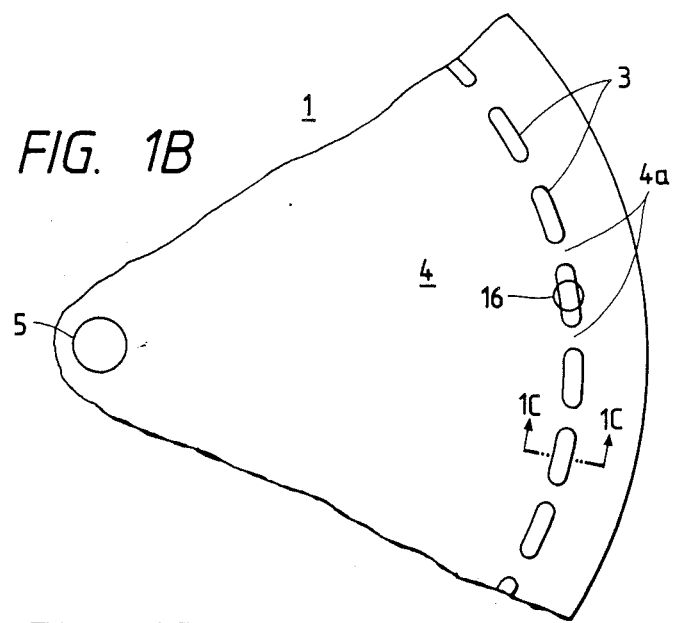
FIG. 1B is an enlarged fragmentary plan view of the rotary encoder disc shown in FIG. 1A.
Figure 1C:
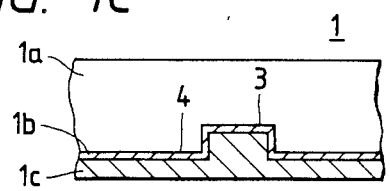
FIG. 1C is a cross-sectional view taken along line 1C—1C of FIG. 1B.

FIGS. 1A through 1C show a reflective rotary encoder disc 1 which is manufactured by the process of fabricating compact discs or video discs. As shown in FIG. 1C, the rotary encoder disc 1 comprises a circular base 1a made of a transparent plastic material such as a polycarbonate resin, the circular base 1a having an annular or ring-shaped series or pattern of successive pits or depressions 3 defined in one surface thereof and equally angularly spaced at angular intervals, a reflecting film 1b of a metal such as aluminum disposed by evaporation or sputtering on the pitted surface of the base 1a, and a protective film 1c of an ultraviolet curing resin deposited intimately on the reflecting film 1b.

Laser beams are applied as beam spots to the encoder disc 1 from above in FIG. 1C. The laser beams first pass through the transparent base 1a and then are reflected upwardly by the reflecting film 1b. Therefore, the transparent base 1a normally faces a laser beam pickup of a reflective optical rotary encoder device (described later on). From the standpoint of the laser beams applied to the encoder disc 1, the pits 3 do not appear as concavities but convexities or protrusions provided on a land 4, and interpit lands 4a defined between the adjacent pits 3 do not appear as convexities but concavities.

As illustrated in FIG. 1B, a laser beam 16 is applied as a beam spot to the pits 3 by the laser beam pickup device. Each of the pits 3 has a length in the circumferential direction of the encoder disc 1, the circumferential length being larger than the diameter of the laser beam spot 16. Each of the pits 3 also has a width in the radial direction of the encoder disc 1, the radial width being smaller than the diameter of the laser beam spot 16. For example, the radial width of each pit 13 is about ¼ of the diameter of the laser beam spot 16. Each of the pits 3 also has a height (i.e., depth) which substantially corresponds optically to ¼ of the wavelength λ of the laser beam. Each of the inter-pit lands 4a is circumferentially positioned between adjacent ones of the pits 3, and has a circumferential length that is the same as the circumferential length of each of the pits 3. The alternately arranged pits 3 and inter-pit lands 4a jointly make up an annular encoder track 2 concentric with a central hole 5 defined in the rotary encoder disc 1 and having a pattern of regular surface convexities and concavities which will be detected by the laser beam pickup.

Figure 2:
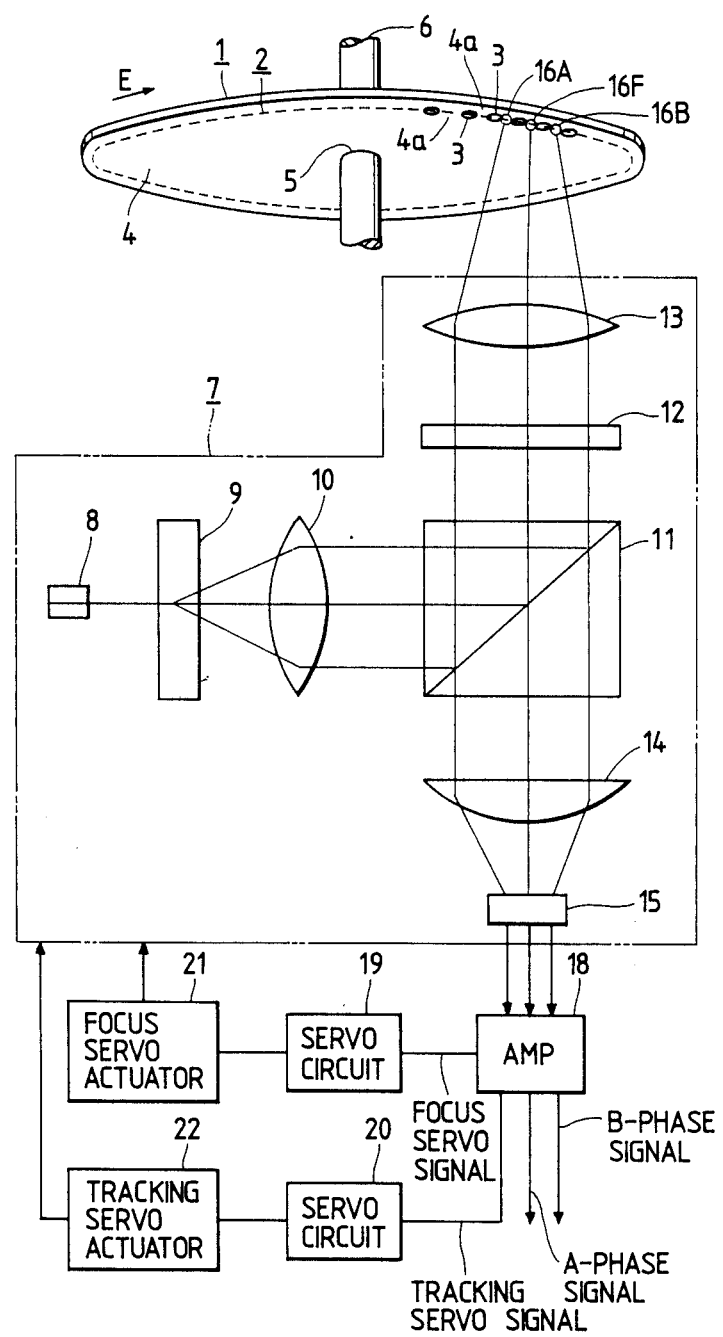
FIG. 2 is a schematic view of a reflective rotary encoder device according to the present invention which employs the reflective optical rotary encoder disc shown in FIGS. 1A through 1C.

FIG. 2 shows a reflective optical rotary encoder device according to the present invention. As shown in FIG. 2, the encoder disc 1 is fixedly mounted on an input shaft 6 rotatably supported by a bearing (not shown) and extending through the central hole 5, so that the rotary encoder disc 1 will rotate with the input shaft 6. The input shaft 6 is directly coupled to a drive shaft (not shown) of a rotatable member whose angular speed or position is to be detected. Therefore, the input shaft 6 is rotated about its own axis by the drive shaft. The pattern of the encoder track 2 which is composed of the alternately arranged pits 3 and inter-pit lands 4a is read by the laser beam pickup 7, which then detects the angular speed or position of the drive shaft.

The laser beam pickup 7 comprises a semiconductor laser 8, a diffraction grating 9, a collimator lens 10, a polarization beam splitter 11, a quarter wave plate 12, an objective lens 13, a cylindrical lens 14, and a photodiode array 15.

A laser beam generated by the semiconductor laser 8 is divided into an array of three laser beams by the diffraction grating 9. These three laser beams pass through the collimator lens 10, the polarization beam splitter 11, the quarter wave plate 12, and the objective lens 13, and are applied as the beam spots 16A, 16F, 16B to the encoder track 2 on the rotary encoder disc 1. The three beam spots 16A, 16F, 16B will also collectively be referred to as a beam spot 16. The central one of the three laser beam spots, 16F, is used for focus servo and tracking servo, whereas the other laser spots 16A, 16B, one on each side of the central laser beam spot 16F, are used to read the encoder track 2.

The three laser beams applied to the rotary encoder disc 1 are reflected by the surface of the reflecting film 1b of the encoder disc 1, and return to the polarization beam splitter 11 through the objective lens 13 and the quarter wave plate 12. Since the laser beams have now passed through the quarter wave plate 12 twice, the laser beams returning to the beam splitter 11 have a plane of polarization which is perpendicular to that of the laser beams going to the quarter wavelength plate 12 from the polarization beam splitter 11. Therefore, the laser beams which have passed through the quarter wave plate 12 twice are not reflected by, but pass through, the polarization beam splitter 11. The laser beams that have passed through the polarized beam splitter 11 then go through the cylindrical lens 14 and are applied to the photodiode 15, by which the laser beams are converted to electric signals that are produced as amplified output signals by an amplifier circuitry 18.

It is possible that the rotary encoder disc 1 may be mounted on the input shaft 6 with poor accuracy, and may axially oscillate during rotation, with the result that the beam spots applied to the rotary encoder disc 1 may be defocused. To avoid such a defocused condition, there is employed a focus servo for keeping the beam spot 16 properly focused on the surface of the encoder disc 1. The focus servo will be described below with reference to FIGS. 5A through 5C.

Figure 5A:
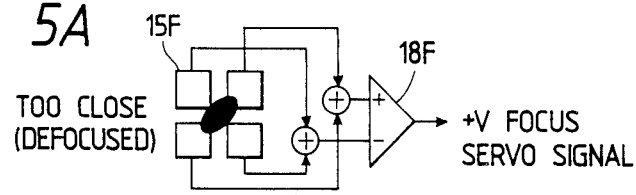
FIGS. 5A through 5C are block diagrams showing a focus servo of the rotary encoder device of FIG. 2.
Figure 5B:
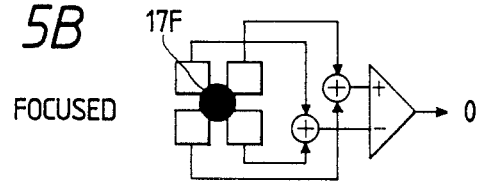
Figure 5C:
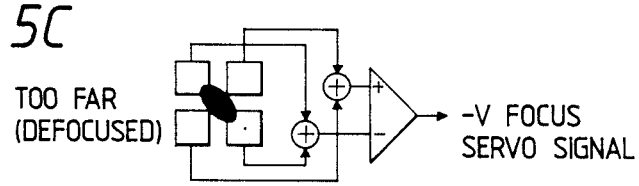

FIG. 5A shows the manner in which the focus servo signal is derived when the surface of the encoder disc 1 is too close to the laser beam pickup 7 (i.e., the beam spot 16F is defocused). FIG. 5B shows the manner in which the focus servo signal is derived when the beam spot 16F is properly focused on the surface of the encoder disc 1. FIG. 5C shows the manner in which the surface of the encoder disc 1 is too far from the laser beam pickup 7 (i.e., the beam spot 16F is defocused).

The focus servo includes a part of the photodiode array 15 in the laser beam pickup 7. As shown in FIGS. 5A through 5C, the photodiode array 15 includes a four-sector or four-divided photodiode 15F for receiving a reflected beam from the central beam spot 16F (FIG. 2). The four-sector photodiode 15F includes two diagonal pairs of detectors. The output signals from the detectors of each pair are added to each other, and the sum signals from the detector pairs are applied to the input terminals, respectively, of a differential amplifier 18F connected to a focus servo circuit 19 (FIG. 2). When the encoder disc 1 is properly positioned so that the beam spot 16F is properly focused on the encoder disc 1, the reflected laser beam forms a circular spot 17F that falls equally on the four detectors of the four-sector photodiode 15F, as shown in FIG. 5B. Therefore, the differential amplifier 18F produces no output signal, and the focus servo circuit 19 does not operate. When the surface of the encoder disc 1 is too close to or too far from laser beam pickup 7, the reflected beam forms an elliptical spot on the four-sector photodiode 15F, and thus the differential amplifier 18F produces a focus servo signal. In response to the focus servo signal, the focus servo circuit 19 operates a focus servo actuator 21 (FIG. 2) to move the objective lens 13 for focusing the beam spot 16 on the encoder disc 1. Therefore, the beam spot 16 is always well focused on the surface of the reflecting film 1b of the encoder disc 1.

Figure 6:
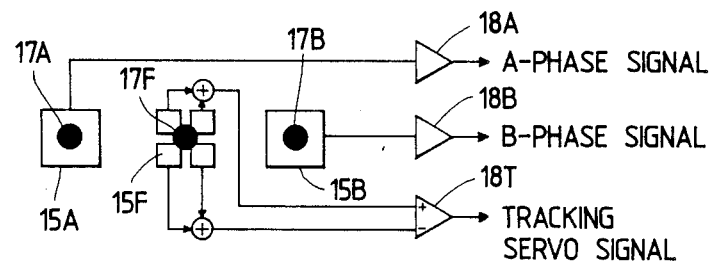
FIG. 6 is a block diagram of a tracking servo and a signal generator of the rotary encoder device of FIG. 2.

FIG. 6 shows a tracking servo and a signal generator of the reflective optical rotary encoder device of the present invention. The tracking servo ensures that output signals from the laser beam pickup 7 will not suffer from fluctuations which would otherwise be caused by undesirable eccentricity of the encoder disc 1. FIG. 6 illustrates the photodiode array 15 in detail. The photodiode array 15 includes, in addition to the four-sector photodiode 15F, two photodiodes 15A, 15B for receiving reflected laser beam spots 17A, 17B corresponding respectively to the laser beam spots 16A, 16B. The photodiodes 15A, 15B are disposed one on each side of the four-sector diode 15F which detects the reflected laser beam spot 17F. The photodiodes 15A, 15B serve as the signal generator for generating output signals which are amplified into A- and B-phase signals, respectively, by corresponding amplifiers 18A, 18B (described later on).

The tracking servo for controlling the laser beam spot 16 to follow the encoder track 2 at all times will be described below.

The four-sector photodiode 15F for detecting the reflected laser beam spot 17F corresponding to the central laser beam spot 16F on the encoder disc 1 is employed not only for the focus servo, as described above, but also for the tracking servo. The output signals from two detectors of the four-sector photodiode 15F which are positioned on one side of the array of three laser beam spots 17A, 17F, 17B are added to each other, and the sum signal is applied to one input terminal of a differential amplifier 18T, whereas the output signals from the other two detectors of the four-sector photodiode 15F which are positioned on the other side of the beam spot array are added to each other, and the sum signal is applied to the other input terminal of the differential amplifier 18T. If the beam spot 16F is displaced radially from the pattern of pits 3, i.e., the encoder track 2, then the input signals applied to the input terminals of the differential amplifier 18T vary complementarily to each other, causing the differential amplifier 18T to produce a tracking servo signal. The tracking servo signal is then applied to a tracking servo circuit 20 which enables a tracking servo actuator 22 to move the laser beam pickup 7 to positionally correct the beam spot 16F radially so that the beam spot 16F will always be positioned centrally across the pit pattern, i.e., the encoder track 2.

Now, the process of reading the pits 3 or the encoder track 2 with the laser beam spots 16A, 16B to produce detected signals indicative of the encoder track 2 from the reflected laser beam spots 17A, 17B will be described below.

When the laser beam spot 16A or 16B) falls on any of the inter-pit lands 4a between the pits 3, the laser beam reflected by this inter-pit land 4a is applied to the photodiode 15A or 15B of the photodiode array 15 substantially in its entirety without a significant intensity reduction. When the laser beam spot 16 falls on one of the pits 3, since the height of the pit 3 substantially corresponds optically to ¼ of the wavelength λ of the laser beam generated by the semiconductor laser 8, the lengths of the optical paths along which the laser beam reflected from the pit 3 and the laser beam reflected from an adjoining portion of the land 4 differ from each other by (¼ of the wavelength)×2, and the laser beams reflected by the pit 3 and the inter-pit land 4a interfere with each other so that the intensity of the resultant laser beam incident on the photodiode 15A or 15B is weakened. The reflected laser beam intensity is converted to an electric signal by the photodiode 15A or 15B. In this manner, the pits 3, i.e., the encoder track 2, are read by the laser beam spots 16A, 16B.

More specifically, the output signals from the photodiodes 15A, 15B are amplified by the respective amplifiers 18A, 18B, which then produce the A- and B-phase signals that are used as detected signals indicative of the encoder track 2.

FIG. 3A shows a dimensional relationship between the pits 3, the inter-pit lands 4a, and the laser beam spots 16A, 16F, 16B. In FIG. 3A, the circumferential length l of the pits 3 and the inter-pit lands 4a is substantially the same as the diameter d of the laser beam spots 16A, 16F, 16B. The centers of these laser beam spots 16A, 16F, 16B are kept in alignment with the array of pits 3, i.e., the encoder track 2 by the diffraction grating 9 and the tracking servo described above. The interval or pitch P between adjacent two of the laser beam spots 16A, 16F, 16B is selected by the diffraction grating 9 so as to meet the following equation:

$$P = \left( \frac{1.5 + n}{2} \right) l$$

where n is an integer of 1 or more. In FIG. 3A, n is 2.

When the rotary encoder disc 1, i.e., the encoder track 2, is rotated in the direction indicated by the arrow E (FIGS. 2 and 3A), the laser beam pickup 7 produces an A-phase signal having a sinusoidal waveform a (FIG. 3B) in response to a reflected beam from the beam spot 16A and a B-phase signal having a sinusoidal waveform b (FIG. 3C) in response to a reflected beam from the beam spot 16B because the beam spot 16A leads the beam spot 16B by 90° with respect to the array of pits 3 as shown in FIG. 3A. The waveforms a, b of the A- and B-phase signals are out of phase with each other by a phase angle of 90°, which will be used to detect the direction in which the rotary encoder disc 1 is rotated.

FIG. 4A shows another dimensional relationship between the pits 3, the inter-pit lands 4a, and the laser beam spots 16A, 16F, 16B. In FIG. 4A, the circumferential length l of the pits 3 and the inter-pit lands 4a is larger than (about twice in the illustrated embodiment) the diameter d of the laser beam spots 16A, 16F, 16B. The relationship between the pitch P of the laser beam spots 16A, 16F, 16B and the circumferential length l of the pits 3 and the inter-pit lands 4a is selected to meet the above-mentioned equation similarly to the case shown in FIG. 3A. The centers of these laser beam spots 16A, 16F, 16B are kept in alignment with the array of pits 3, i.e., the encoder track 2 by the diffraction grating 9 and the tracking servo described above.

When the rotary encoder disc 1, i.e., the encoder track 2, is rotated in the direction indicated by the arrow E (FIGS. 2 and 3A), the laser beam pickup 7 produces an A-phase signal having a waveform a-2 (FIG. 4B) in response to a reflected beam from the beam spot 16A and a B-phase signal having a waveform b-2 (FIG. 4C) in response to a reflected beam from the beam spot 16B.

The waveforms a-2, b-2 of the A- and B-phase signals (FIGS. 4B and 4C) which are produced with l>d as shown in FIG. 4A are different from the sinusoidal waveforms a, b as shown in FIGS. 3B and 3C. The waveforms a-2, b-2 of the A- and B-phase signals thus generated however are still out of phase with each other by a phase angle of 90°. Which one of the waveforms a, b or the waveforms a-2, b-2 leads the other varies depending upon whether the integer n in the above equation is an odd number or an even number.

With the arrangement of the present invention, the signal generator shown in FIG. 6 is capable of generating two detected signals or A- and B-phase signals that are out of phase with each other by a phase angle of 90° and will be used to detect the direction in which the encoder disc 1 or the encoder track 2 is rotated.

In the illustrated embodiment, the encoder track 2 comprises only one series of pits 3. However, a plurality of concentric series of pits may be defined in the encoder disc 1. If such a plurality of concentric series of pits are employed, when the tracking servo starts to operate, the laser beam spot 16F is positioned on any one of the plural series of pits. Therefore, the tracking servo can operate more stably than is possible if only one series of pits is available.

While the encoder track 2 is shown as being disposed on only one side of the rotary encoder disc 1, it may be provided on each of the opposite sides of the encoder disc.

The principles of the present invention are also applicable to a reflective optical linear encoder device for detecting a linear motion of a movable member.

Although a certain preferred embodiment has been shown and described, it should be understood that many changes and modifications may be made therein without departing from the scope of the appended claims.

What is claimed is:

1. A reflective optical encoder device for detecting an angular or linear speed or position of a movable member, comprising:
   an optical encoder movable in response to angular or linear movement of the movable member, said optical encoder having an encoder track composed of a series of equally spaced pits alternating with inter-pit lands therebetween, said pits and said inter-pit lands having equal lengths l;
   a light beam pickup for applying three light beams as respective light beam spots to said optical encoder and detecting light beams reflected from the light beam spots on said optical encoder to produce electric signals representative of said encoder track; and
   adjacent two of said light beam spots on said optical encoder being spaced at a pitch P expressed by:

$$P = \left( \frac{1.5 + n}{2} \right) l$$

where n is an integer of 1 or more.

2. A reflective optical encoder device according to claim 1, wherein said integer n is 2.

3. A reflective optical encoder device according to claim 1, wherein said length l is substantially the same as the diameter of each of said light beam spots.

4. A reflective optical encoder device according to claim 1, wherein said length l is larger than the diameter of each of said light beam spots.

5. A reflective optical encoder device according to claim 4, wherein said length l is substantially equal to twice the diameter of each of said light beam spots.

6. A reflective optical encoder device according to claim 1, wherein said light beam pickup comprises means for generating, as said electric signals, a focus servo signal, a tracking servo signal, and two signals each representative of said encoder track which are out of phase with each other by a phase angle substantially equal to 90°.

* * * * *

UNITED STATES PATENT AND TRADEMARK OFFICE
CERTIFICATE OF CORRECTION

PATENT NO. : 4,987,301

DATED : January 22, 1991

INVENTOR(S) : Nobuaki NAKAMURA

It is certified that error appears in the above-identified patent and that said Letters Patent is hereby corrected as shown below:

On title page and column 1, lines 2-4

Change the title to --REFLECTIVE OPTICAL ENCODER DEVICE WITH LIGHT BEAMS APPLIED AS SPOTS SPACED BY A PREDETERMINED PITCH--

Signed and Sealed this

Eighteenth Day of August, 1992

Attest:

DOUGLAS B. COMER

*Attesting Officer*    Acting Commissioner of Patents and Trademarks